United States Patent

Vassar et al.

[15] 3,650,365
[45] Mar. 21, 1972

[54] HITCHING ASSEMBLY

[72] Inventors: Jack K. Vassar, P.O. Box 460; Boby J. Henigman, P.O. Box 452, both of Perkins, Okla. 74059

[22] Filed: Feb. 16, 1970

[21] Appl. No.: 11,669

[52] U.S. Cl. .............................. 198/7 BL, 198/13, 198/178, 214/42 R, 280/473
[51] Int. Cl. ....................................................... B65g 65/06
[58] Field of Search .................. 214/42 R; 198/7, 7 BL, 8, 9, 198/11, 13, 178; 280/411 B, 412, 413, 472, 473

[56] References Cited

UNITED STATES PATENTS

| 2,909,264 | 10/1959 | Kneib | 198/7 BL |
| 2,442,267 | 5/1948 | Eksergian | 280/473 X |
| 2,556,409 | 6/1951 | Armstrong | 214/42 |
| 1,853,253 | 4/1932 | Bennett | 198/7 BL X |
| 2,597,220 | 5/1952 | Appel | 198/7 BL X |
| 3,200,936 | 8/1965 | Briggs | 198/178 |

FOREIGN PATENTS OR APPLICATIONS

| 1,027,449 | 4/1958 | Germany | 198/178 |

*Primary Examiner*—Robert G. Sheridan
*Attorney*—Dunlap, Laney, Hessin & Dougherty

[57] ABSTRACT

The present invention relates to apparatus for hitching a movable frame to a vehicle and is primarily useful in combination with a bale loader. When used with a bale loader, the present invention may comprise a tension member which bears the primary pulling tension and which is secured at one of its ends to a towing vehicle, such as the side of a truck, while the other of its ends is pivotally secured to the rear portion of the bale loader. At the point of contact between the tension member and the vehicle there is provided a universal type coupling to allow limited, relatively free motion between the tension member and the towing vehicle. Near the front of the frame which carries the bale loader there is provided an elongated guide means which in a preferred embodiment is shaped in the form of an inverted "U" with the downwardly pointing arms of the "U" being rigidly secured to opposite sides of the bale loader frame. Connecting means are provided between the upper portion of the guide means and a point on the tension member immediately behind the point at which the tension member is secured to a vehicle. The point of connection between the connecting means and guide means may be varied and for this purpose there may be provided a sleeve which is slidably mounted upon the guide means and which carries an outwardly projecting connecting stub which fits into an aperture formed in the connecting means. Means, such as a threaded bolt, is provided in combination with the sleeve to allow the sleeve to be securely locked into place at a given point upon the guide means and thereafter, upon loosening the bolt, moved to another point thereon without removing the sleeve therefrom.

6 Claims, 7 Drawing Figures

Patented March 21, 1972

INVENTORS
JACK K. VASSAR &
BOBY J. HENIGMAN
BY
ATTORNEYS

Patented March 21, 1972
3,650,365
3 Sheets-Sheet 2
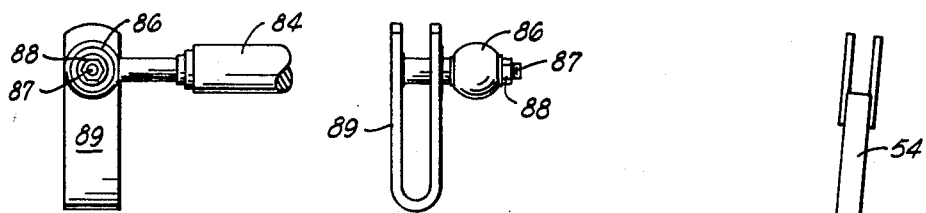
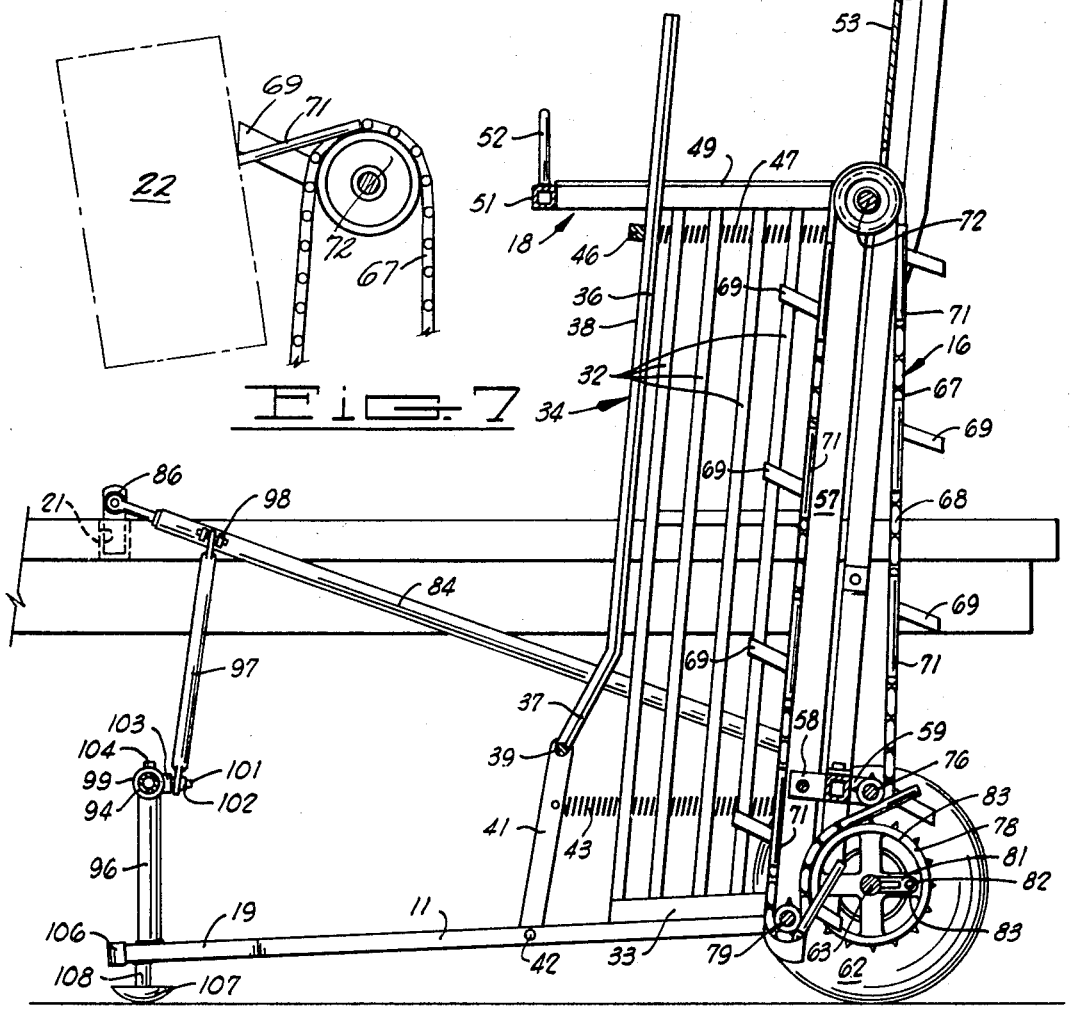
INVENTORS.
JACK K. VASSAR &
BOBY J. HENIGMAN
BY
Dunlap, Laney, Hessin & Dougherty
ATTORNEYS Patented March 21, 1972

INVENTOR.
JACK K. VASSAR &
BOBY J. HENIGMAN
BY

*Dunlap Henry, Hessin & Dougherty*
ATTORNEYS

HITCHING ASSEMBLY

BACKGROUND OF THE INVENTION

Within the past few decades many of the agricultural tasks which had previously been done by hand, or with very rudimentary equipment, have been taken over by relatively complex machinery. Among such tasks which are now done quite effectively by mechanical means is the task the farmer previously faced in lifting bales of cured hay from the surface of the field and placing them on a vehicle to be conveyed from the field to the hay shed. Typically, the mechanical apparatus which has been developed for this purpose includes a frame which rolls across the surface of the earth and which is secured to the side of a truck on which the hay is to be placed. Projecting upwardly from the frame there is commonly a hay bale chute, or passageway, through which the bales of hay are moved by a conveyor. As the bales emerge from the top of the passageway, they are deflected onto a platform which in prior art apparatus extended beyond the hay loader over a portion of the bed of the hay truck in order to allow safe removal of the bales from the loader to the hay truck during the time in which the hay bales were not stacked too high on the truck.

As the height of the stack of hay bales on the hay truck increases, however, a problem is encountered due to the overlap of the platform from the bale loader with the bed of the hay truck. Since, with most prior art apparatus, the hay bales cannot be stacked above the level of the hay loader platform in the area of the platform, the present invention was designed to provide a hitching mechanism which allows movement of the hay loader away from the hay truck to obviate the overlap of the loader platform with the bed of the truck whenever the level of the hay on the truck nears the underside of the loader platform.

DESCRIPTION OF THE DRAWINGS

Apparatus embodying one form of the present invention which solves the problem discussed immediately above is disclosed in the following description which is to be read in conjunction with the accompanying drawings wherein like reference characters designate like parts in all views and wherein:

FIG. 2 is a side, cross-sectional view taken along line 2—2 of FIG. 1 showing details of an elevating conveyor;

FIG. 5 is an enlarged side view of universal coupling means with which the bale loader is secured to a tow vehicle; and FIG. 6 is a front elevational view of the coupling means shown in FIG. 5.

FIG. 7 is a side elevational view of the detailed structure of the chain 67 and idler sprocket 72 illustrating the manner in which the release bars 71—71 cooperate with the tines 69—69 as the chain 67 passes over this sprocket. A hay bale is shown in dashed lines.

GENERAL DESCRIPTION OF THE APPARATUS

Figure 1:
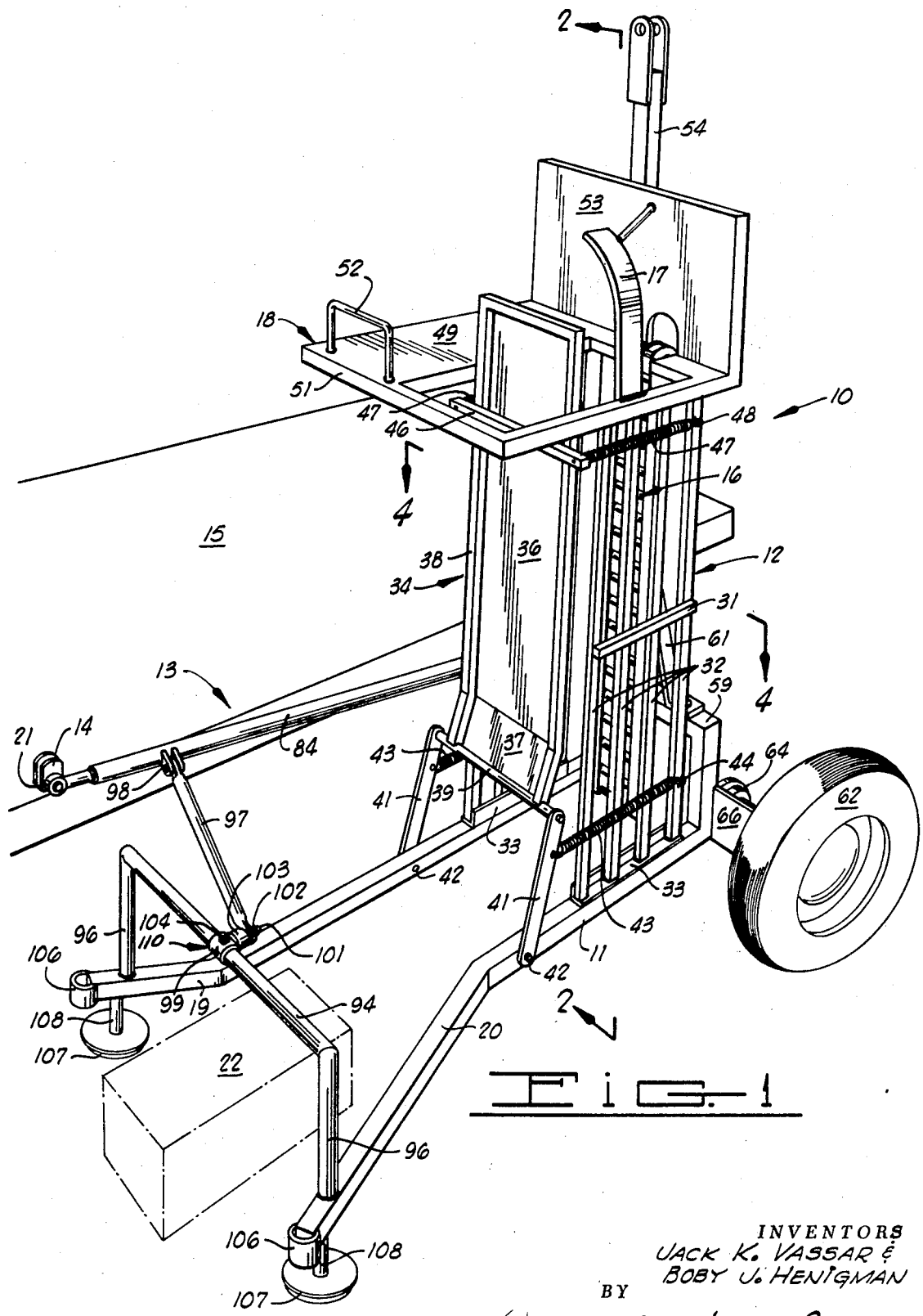
FIG. 1 is a perspective view of a bale loader which carries a hitching apparatus embodying the present invention.
Figure 3:
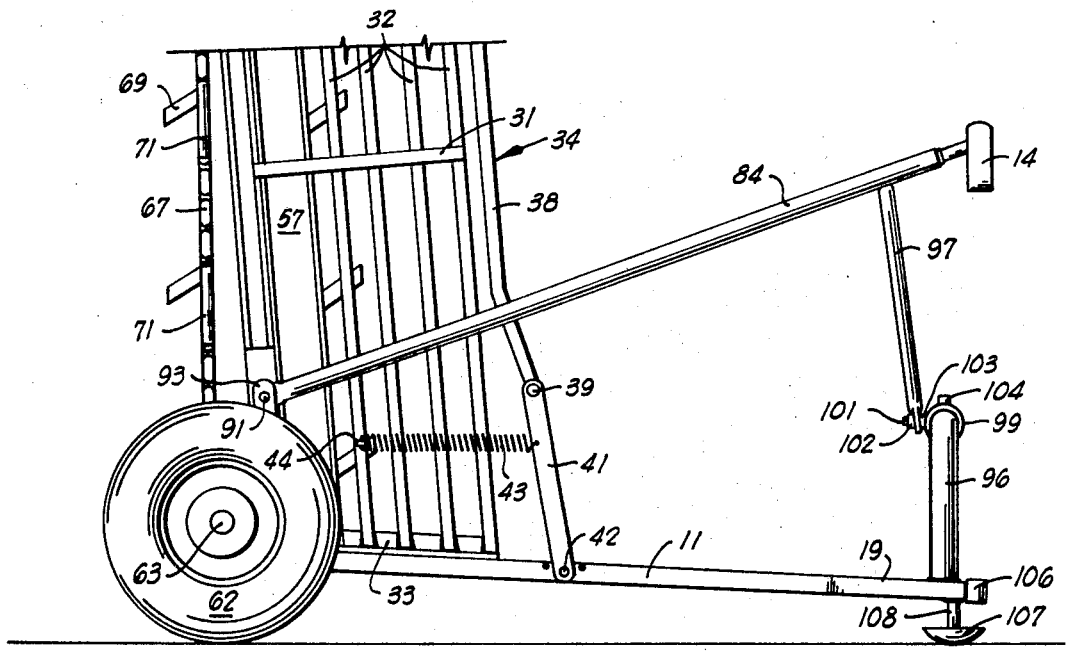
FIG. 3 is a partial side view of the apparatus shown in FIG. 1 showing that portion of the apparatus which faces away from the viewer in FIG. 1 wherein the manner of attachment of the hitching apparatus with the bale loader is shown.
Figure 4:
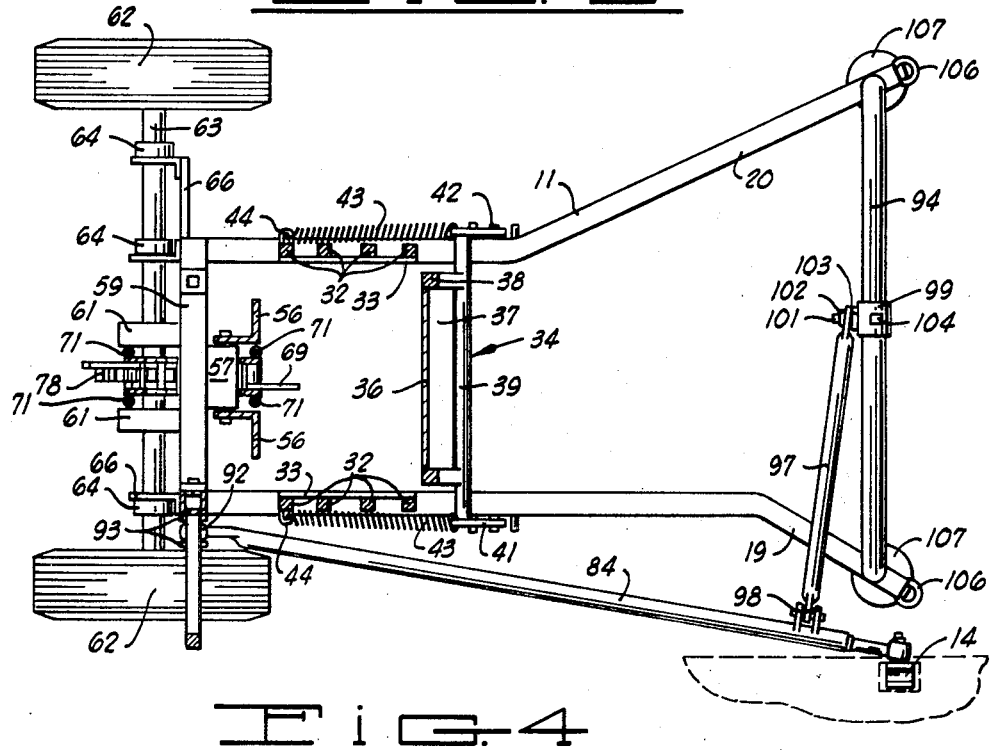
FIG. 4 is a top sectional view taken along line 4—4 of FIG. 1 showing further details of the hitching apparatus.

Turning now to the drawings and in particular to FIG. 1, there is shown a bale loader indicated generally by the numeral 10 which includes a frame 11 and a hay elevator tower 12 mounted thereon. At the forward portion of frame 11 is provided a pair of outwardly extending divergent guide strips 19 and 20 which provide a relatively large area which encounters hay bales located on the ground in front of the bale loader. In addition, a hitching assembly which provides the basis of the present invention and which is indicated generally by the numeral 13 is pivotally secured at the rear of frame 11 as indicated in FIG. 3 and 4 and is also secured at the upper portion of frame 11. At the forward portion of hitching assembly 13 there is provided universal coupling means 14 for securing the hitching assembly within a stake well 21 at the side of a hay truck bed 15.

As bale loader 10 is moved against hay bales 22, the bales encounter the lower, rear portion of elevator tower 12 whereupon they are elevated by an elevator assembly best shown in FIG. 2 and indicated generally by the numeral 16. Upon reaching the top of elevator tower 12, the bales are deflected by a resilient curved deflector 17 onto a horizontal platform assembly 18 from which they are manually removed and placed on the hay truck bed 15.

Means to be described hereinafter are provided in the mechanism of hitching assembly 13 for adjusting the distance between truck bed 15 and bale loader 10.

DETAILED DESCRIPTION OF THE BAIL LOADER

The elevator tower 12, which forms a portion of bale loader 10, is secured to the rearward portion of frame 11 and in its operative position is canted backward from about 5° to about 15° from the vertical. Tower 12 comprises a plurality of substantially vertical upright members 32—32 braced by longitudinal braces 31—31 and secured on the outer side of frame 11 to angle iron braces 33—33 mounted on opposite sides of frame 11. An elongated pressure plate assembly 34 forms the front of elevator tower 12 and includes a plate 36, the lower portion, 37, of which is angled forward in order to furnish clearance to hay bales as they begin their movement upward in tower 12. A box frame 38 completely surrounds plate 36 to provide rigidity thereto and is secured at its lower end to a horizontal rod 39. At the outer ends of rod 39 are pivotally secured pressure levers 41—41, the lower ends of which are pivotally mounted on frame 11 by means of pivot pins 42—42 and which function to support frame 38 and plate 36. Tension springs 43—43 are carried by the upper portion of pressure levers 41—41 with one end of the springs being secured to the lower portion of the rearward upright member 32—32 as indicated at connections 44—44. By this mechanism the lower portion of pressure plate assembly 44—44 is held securely against hay bales as they are carried upwardly in elevator tower 12. Similar apparatus appears in the upper portion of tower 12 and includes a horizontal cross bar 46 mounted on box frame 38 across plate 36. To the outer ends of cross bar 46 are secured tension springs 47—47 which pull the upper portion of pressure plate assembly 44 toward the inside of tower 12 because of their attachment, as at 48—48, to the upright members 32—32 which are located at the extreme rear of frame 11.

Bale platform 18 includes a platform plate 49 mounted on a substantially horizontal platform box frame 51. A guide rail 52 mounted on the forward edge of plat 49 serves to prevent bales from the platform assembly 18 from falling off the platform assembly in front of tower 12, while a similar function is served by a substantially vertical guard plate 53 carried at the rear edge of platform box frame 51. A hitch 54, shown best in FIG. 3, is carried by the central portion of guard plate 53 and projects therefrom beyond the top of tower 12. Hitch 54 is used to transport bale loader 10 to and from the fields during which time elevator tower 12 is moved to a horizontal position with hitch 54 being secured to a towing vehicle.

The rear portion of tower 12 comprises a pair of longitudinally extending parallel guide tracks 56—56 (FIG. 4) which are mounted parallel to the longitudinal axis of tower 12 on a vertical support rail 57. A portion of elevator assembly 16 is disposed between tracks 56—56 so that bales being carried by the elevator assembly engage the tracks and are held thereon due to the restraining action of the plate 36. Connecting members 58—58 function to secure the lower portion of rail 57 to a horizontal element 59 of frame 11 which is located at the rear of elevator tower 12. Similarly, the upper end of support rail 57 is secured to the inside of platform box frame 51. A pair of braces 61—61 lend rigidity to support rail 57 and are secured thereto near the center thereof and also on the top of frame element 59.

A pair of pneumatic tires 62—62 are mounted for motion with a rotatable axle 63 at the lower rear edge of frame 11. Mounting for the axle is provided by a plurality of bearing journals 64—64 which are secured to frame 11 by journal plates 66—66.

DETAILED DESCRIPTION OF THE ELEVATOR ASSEMBLY

Elevator assembly 16, which moves hay bales 22 upwardly through elevator tower 12, comprises a continuous, looped, articulated chain 67 consisting of a plurality of links 68—68. Secured along chain 56 are a plurality of bale impaling tines 69—69 which project outwardly from the surface of chain 67 to engage and hold bales within elevator tower 12. As viewed in FIG. 2 it will be seen that the bale tines moving upwardly inside tower 12 form an upwardly facing acute angle with a longitudinal axis of the chain, while similar tines form a downwardly facing acute angle with the chain in the descending position thereof.

It will be appreciated that some mechanism must be provided for removing the hay bales from bale impaling tines 69—69 at the upward portion of chain 67 in the interior of elevator tower 12. This function is served by a plurality of bale release bars 71—71 which are paired with tines 69—69 and mounted on the outside edge of chain 67 at positions forward of tines 69—69, so that when the chain is in an unarticulated position an end of release bars 71—71 extends from their point of attachment with chain 67 in a direction toward and slightly beyond the tine with which it is paired. In this regard it is important to note that release bars 71—71 are not secured to chain 67 along the total length of the bars but are instead secured to an individual link of the chain at the end of the bar which is spaced away from the tine with which the bar is paired.

The suspension assembly for chain 67 includes a centrally grooved idler roller 72 mounted on the upper end of support rail 57 at a cutout portion thereof. The idler roller 72 is dimensioned so that the free end of bale release bars 71—71 passing over sprocket 72 will not be moved outwardly from the outer end of the impaling tines 69—69 with which they are paired.

At the bottom of tower 12 an idler sprocket 76 over which chain 67 passes from gear 73 is rotatably secured to a horizontal sprocket bar 77, the opposite end of which is mounted near the center of frame element 59. As chain 67 passes over idler sprocket 76 it thereupon engages a power sprocket 68 and from thence is moved around a lower idler gear 79 which is rotatably secured to a portion of frame 11. Leaving gear 79, chain 67 moves upwardly toward idler sprocket 72 to complete the loop.

Driving power is furnished to power sprocket 78 from axle 63 on which it is freely rotatably journaled. For this purpose a drive lug 81 is formed integrally with axle 63 at a position immediately adjacent the side of power sprocket 78. An aperture 82 is formed near the outer end of lug 81 which may be aligned with a corresponding aperture formed in the hub of power sprocket 78. When the apertures are thus aligned, a pin 83 is inserted thereinto whereby power sprocket 78 is made to rotate together with the rotation lug 81. When it is desired to move bale loader 10 across country, pin 83 is removed so that as lug 81 is rotated by axle 63 no corresponding rotation of power sprocket 87 will take place and thus chain 67 will remain stationary.

The manner in which hay bales are engaged, moved and disengaged from chain 67 is as follows. As bale loader 10 is moved into the vicinity of a hay bale 22, the rear surface of the hay bale engages a bale impaling tine 69 on which it becomes impaled due to the relative motion of the bale loader with the bale. As this occurs the bale is pivoted into a vertical position and is moved upwardly within the interior of elevator tower 12 by the action of chain 67. Continuous engagement of the bale with its associated tine is afforded due to the pressing action of pressure plate assembly 34 from the tension of springs 44—44 and 47—47. As the bale reaches the upward end of tower 12, adjacent platform assembly 18, it is deflected toward platform plate 49 by deflector 17. Simultaneously, the bale release bar 71 associated with the tine 69 on which the bale is impaled begins to move about idler roller 72 whereupon the lower end of release bar 71 pivots outwardly along the longitudinal axis of tine 69 to force the bale off the tine. As release bar 71 continues its motion about roller 72 it is prevented from moving past the outer end of tine 69 because of the angulation in chain 67 brought about by its passage over the idler roller 72. This prevents tufts of hay from being caught between tines 69—69 and release bars 71—71 as the release bars are returned to their normal position alongside chain 67 upon further descent of chain 67. This relationship is shown in FIG. 7 of the drawings.

DETAILED DESCRIPTION OF THE HITCHING ASSEMBLY

Hitching assembly 13 includes a tension member 84 which provides the major portion of the pulling force to the bale loader. Universal coupling means 14 includes a ball joint 86 located at the outward end of tension member 84. (As used herein the term "universal coupling" includes structure designed to permit compound pivotal movement, i.e., movement about two perpendicular axes at the same time or at different times.) Ball joint 86 is secured on a threaded stub shaft 87 by a nut 88 while the opposite end of the stub shaft is held rigidly upon the upper portion of a U-shaped shear coupler 89, which is designed to project into stake well 21 at the edge of truck bed 15. The opposite end of tension member 84 is pivotally secured to a pin 91 which projects through an aperture 92 formed in the end of the tension member. Pin 91 is mounted upon frame element 59 by means of a pair of brackets 93—93 which are spaced on the upper surface of frame element 59 at a distance greater than the width of the rear end of tension member 84. In addition, aperture 92 is larger than pin 91 to allow limited motion of tension member 84 in a plane which includes the longitudinal axis of pin 91. By this means the angle between tension member 84 and frame 11 may be altered without any resulting binding in the pivotal connection at the rearward portion of the tension member.

Elongated guide means consisting of a horizontal tubular member 94, at the ends of which are formed a pair of vertical arms 96—96, is mounted between the forward ends of guide strips 19 and 20. Arms 96—96 are of sufficient length to allow tubular member 94 to clear hay bales over which it passes.

In order to give lateral stability to bale loader 10, connecting means, such as a rod 97, is provided. One end of rod 97 is pivotally secured to a forward portion of tension member 84 by connecting means such as a clevis 98, while the opposite end of rod 97 is detachably mounted on a point on tubular member 94 as indicated generally by securing means 98. Securing means 110 is designed to be secured along the length of member 94 at an infinite number of positions and comprises a sleeve 99 slidably secured on tubular member 94 from which sleeve projects a mounting stub 101. Mounting stub 101 passes through an aperture formed in the end of rod 97 and is held in engagement with the rod by an internally threaded nut 102. A spacer member 103 surrounds the portion of stub 101 adjacent sleeve 99 and serves to hold the end of rod 97 away from tubular member 94 to prevent binding. Sleeve 99 is maintained in position on tubular member 94 by a threaded bolt 104 carried in a threaded aperture formed in the upper portion of sleeve 99. When it is desired to fix the position of the sleeve on member 94, an adjustable retaining member, such as bolt 104, is rotated in a clockwise direction to jam against member 94 thus locking the sleeve in position. Alternatively, when it is desired to change the position of sleeve 99 on member 94, bolt 104 is backed off to allow the sleeve to slide freely on the tubular member.

The forward ends of guide strips 19 and 20 are provided with rounded bumpers 106—106 which prevent hay bales from being impaled on the ends of the guide strips. In addition, the vertical position of the guide strips is maintained by skid means 107—107 formed in the shape of a portion of a sphere which is less than a hemisphere with the curved portion thereof facing downwardly. Supports 108—108 serve to couple the upper part of skid means 107—107 with the lower surface of guide strips 19 and 20.

OPERATION

In considering the operation of the apparatus defined hereinbefore let it be assumed that the apparatus is in the position shown in FIG. 1 with sleeve 99 adjusted on horizontal tubular member 94 in a position so that platform assembly 18 projects partly over truck bed 15. With the apparatus in this position the truck associated with bed 15 is moved forward across a field containing hay bales 22. As bale loader 10 is moved toward the hay bales, they serially enter the assembly through the channel between guide strips 19 and 20 and ultimately are brought into engagement with the rear lower portion of elevator tower 12. Thereupon the bales are engaged by a bale impaling tine 69 and raised to the top of elevator tower 12 by chain 67, which is driven, in a manner previously disclosed, from the rotation of tires 62—62. As the hay bales are deflected onto platform plate 49 by deflector 17 they are removed manually and stacked in an orderly fashion on truck bed 15.

This procedure is repeated until the level of the hay bales on the truck bed nears the bottom of platform assembly 18. At this juncture it will, of course, no longer be possible to stack the bales in the area of elevator tower 12 because of the projection of platform assembly 18 over truck bed 15. Motion of bale loader 10 is thereupon interrupted and bolt 104 is rotated in a counterclockwise direction to release sleeve 99 on tubular member 94. The front portion of bale loader 10 may thereupon be moved in a direction away from truck bed 15 until platform assembly 18 clears the truck bed. Bolt 104 may now be tightened to form a jam fit with tubular member 94, thus maintaining the position of the front portion of bale loader 10. Bale loader 10 is then placed in operation again and bales arriving on platform plate 49 may be stacked in a position adjacent elevator tower 12 without interference from the platform assembly.

From the above description it will be seen that the present invention provides means for conveniently and easily altering the position of a bale loader with respect to a truck bed to remove the projection of a portion of the bale loader from over the truck bed thereby allowing completion of loading of hay bales on the truck bed.

It should be understood that the embodiment described herein is presented by way of example only and that many changes and modifications thereto can be made without departing from the spirit of the invention or the scope of the annexed claims.

What is claimed is:

1. In combination with a bale loader which comprises:
   a. a frame having a front and rear end;
   b. a pair of spaced wheels rotatably mounted on said frame near the rear end thereof;
   c. a substantially vertical hay elevator tower secured to the rear portion of said frame between said wheels;
   d. elevator means in said tower for moving bales therein;
   e. means for drivingly connecting the elevator means from said wheels;
   f. deflector means secured at the top of the tower in position thereon to deflect the upward motion of bales passing from the top of the tower; and
   g. a platform secured to the top of the tower for receiving bales which are deflected thereto by said deflector means;
   the improvement which comprises a hitching assembly for hitching the frame to a vehicle, which assembly comprises:

1. a tension member pivotally secured to the frame adjacent the rear portion thereof, said tension member extending therefrom to a free end adjacent the front of said frame;
   2. universal coupling means for coupling the hitching assembly with a vehicle, said coupling means being secured to the free end of said tension member which is adjacent the front of the frame;
   3. elongated guide means carried on the upper side of the frame in a position forward of the tower, the longitudinal axis of said guide means being disposed at an angle to the longitudinal axis of the tension member;
   4. connecting means pivotally secured at a first end to the tension member; and
   5. securing means for releasably and pivotally securing a second end of the connecting means to the guide means for adjustably spacing the frame from a vehicle to which said tension member is connected.

2. The apparatus defined in claim 1 wherein the guide means comprises:
   a. a horizontal member;
   b. a first leg secured at one end of the horizontal member and to one end of the frame;
   c. a second leg secured at the other end of the horizontal member and at the other side of the frame; and wherein the securing means is carried by said horizontal member.

3. The apparatus defined in claim 2 wherein the securing means comprises:
   a. a sleeve slidably disposed upon the horizontal member;
   b. an adjustable retaining member in said sleeve for holding the sleeve in a predetermined position on the horizontal member;
   c. a mounting stub projecting from the sleeve; and
   d. means for securing the connecting means on said mounting stub.

4. The apparatus defined in claim 3 wherein the universal coupling means comprises:
   a. an elongated bar for insertion into an aperture formed in a vehicle; and
   b. a ball joint in operative engagement with said tension member.

5. A bale loader assembly comprising:
   a. a frame having a front end and a rear end;
   b. a pair of spaced wheels rotatably mounted on said frame near the rear end thereof;
   c. a substantially vertical hay elevator tower secured to the rear portion of said frame between said wheels;
   d. deflector means secured at the top of the tower and positioned thereon to deflect the upward motion of bales passing from the top of the tower;
   e. a platform secured to the top of the elevator tower for receiving bales which are deflected thereto by said deflector means;
   f. a hitching assembly secured to the front and rear ends of said frame, said hitching assembly including:
      1. universal coupling means for securing a portion of the hitching assembly to a vehicle; and
      2. adjustable securing means for adjusting the distance from said universal coupling means to the center of the front portion of said hitching assembly;
   g. elevator means carried by said hay elevator tower for moving bales therein, said elevator means comprising:
      1. a looped articulated chain rotatably mounted at the top and bottom of said tower;
      2. a plurality of bale impaling tines spaced on and carried by said chain, said tines projecting outwardly from the interior of said looped chain; and
      3. a plurality of bale release bars carried by said chain, each of said bars being mounted at one end thereof to the side of the chain adjacent to and spaced from a tine whereby the free end of each bar projects along said chain from its point of attachment to the chain to a point on the opposite side of a tine; and
   h. means for driving said elevator means from said wheels.

6. The apparatus defined in claim 5 wherein said means for driving said elevator means comprises:
   a. a rotating axle secured to at least one of said wheels;
   b. a elongated apertured drive lug formed integrally with said axle;
   c. a power sprocket rotatably mounted on said axle and in operative engagement with said chain; and
   d. means for coupling said drive lug to said power sprocket, whereby said power sprocket is rotated by said axle.

* * * * *